United States Patent [19]
Williams

[11] Patent Number: 6,105,725
[45] Date of Patent: Aug. 22, 2000

[54] LOW DISPLACEMENT LUBRICATOR

[75] Inventor: Arthur R. Williams, Spencerport, N.Y.

[73] Assignee: General Motors Corporation, Detroit, Mich.

[21] Appl. No.: 09/086,035

[22] Filed: May 28, 1998

[51] Int. Cl.$^7$ .................................................. F16N 7/12
[52] U.S. Cl. ............................... 184/102; 184/19; 184/64
[58] Field of Search .................................. 184/64, 105.1, 184/105.2, 105.3, 102, 101, 19, 7.4; 222/255, 194

[56] References Cited

U.S. PATENT DOCUMENTS

| | | | |
|---|---|---|---|
| 2,583,457 | 1/1952 | Woodall | 184/102 |
| 2,643,801 | 6/1953 | Kollmeyer | 222/420 |
| 2,811,732 | 11/1957 | Okamoto | 15/133 |
| 2,951,557 | 9/1960 | Jung | 184/102 |
| 4,499,211 | 2/1985 | Walch et al. | 521/145 |
| 4,573,428 | 3/1986 | Ogino et al. | 118/60 |
| 5,197,605 | 3/1993 | Hampton | 206/582 |
| 5,320,442 | 6/1994 | Yanagisawa et al. | 401/172 |
| 5,478,423 | 12/1995 | Sassa et al. | 156/187 |
| 5,658,084 | 8/1997 | Wirt | 401/132 |
| 5,702,759 | 12/1997 | White et al. | 427/142 |
| 5,746,019 | 5/1998 | Fisher | 43/1 |

*Primary Examiner*—David M. Fenstermacher
*Attorney, Agent, or Firm*—John A. VanOphem

[57] ABSTRACT

A low displacement lubricator for use in the process of inserting fuel injectors into fuel injector manifold pods, the lubricator has a defined reservoir having an open cell foam disposed therein and an applicator in fluid communication with the reservoir. The applicator having an open cell foam that provides capillary dispensing of the lubricant. The amount of lubricant applied is in effect metered.

22 Claims, 3 Drawing Sheets

LOW DISPLACEMENT LUBRICATOR

TECHNICAL FIELD

The present invention relates to a low displacement lubricator for dispensing a lubricant. More particularly, the present invention relates to a lubricator that applies, in effect, a metered amount of lubricant which is particularly useful in the process of inserting fuel injectors into fuel injector manifold pods.

BACKGROUND OF THE INVENTION

In the prior art, when inserting fuel injectors into pods of a fuel injector manifold, oil is applied to the pods prior to the insertion of the fuel injectors to reduce the friction associated with such insertion. Reducing friction increases the speed of insertion and protects the o-rings of the fuel injectors during their insertion into the pods. This oil treatment of the injector manifold pods has been a long-standing procedure. The present methods for applying the lubricant to the injector manifold pods has, at times, resulted in the application of more lubricant than necessary. Heretofore, oil soaked sponges in dishes or on sticks have been employed to coat the injector manifold for insertion of the fuel injectors; additionally spray units, typically pneumatically powered, have been employed to spray the injector manifold pods prior to insertion of the fuel injectors.

It will be appreciated that such methods introduce variability into the manufacturing process.

SUMMARY OF THE INVENTION

The present invention offers advantages and alternatives over the prior art by providing a low displacement lubricator which is particularly well suited for lubrication of fuel injector manifolds, which aids in the insertion of fuel injectors therein.

The lubricator of the present invention comprises an applicator in fluid communication with a reservoir. The reservoir is adapted to receive a "charge" of a predetermined quantity of lubricant. The applicator receives lubricant from the reservoir and transfers the lubricant from a surface of the applicator in contact therewith through its matrix to an exterior surface of the applicator where the lubricant may be applied to a part to be lubricated, e.g., fuel injector manifold pods. The applicator is brought into contact with the surface to be lubricated and moved in accordance with the method of the invention to lubricate the intended surface with a predetermined quantity of lubricant.

Preferably, the applicator of the lubricator comprises open cell polyethylene and relies for the transfer of lubricant, from the surface of the applicator in contact with the fluid to an exterior surface of the applicator, upon capillary action within the open cell matrix of the applicator material. The lubricator of the present invention provides for an extremely well regulated and metered amount of lubrication to be applied. It has been determined by the inventors hereof that about 0.001 grams of lubricant are sufficient to lubricate each fuel injector manifold pod prior to insertion of a fuel injector. The prior art methods of applying lubricant, as discussed above, apply many times the required amount of lubricant.

The applicator may be shaped in various ways to optimize application of lubricant and can even be multiply shaped so that a single lubricator is effective for a plurality of parts to be lubricated.

These and other features and advantages of the present invention will be appreciated from the following description, the accompanying drawings, and the appended claims.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
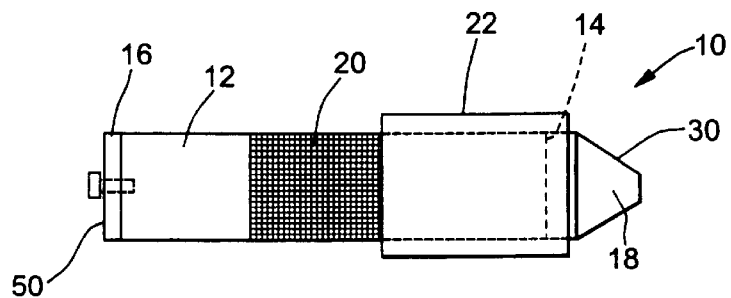
FIG. 1 is a side view of a lubricator in accordance with the invention.
Figure 2:
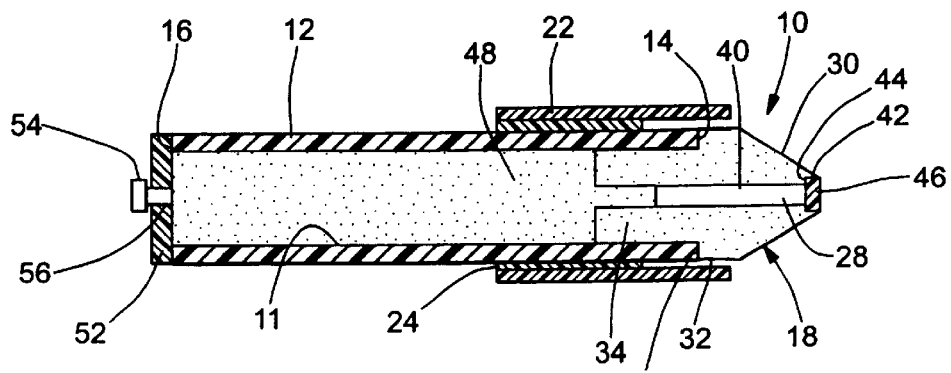
FIG. 2 is a longitudinal cross-section view of the lubricator of FIG. 1.
Figure 3:
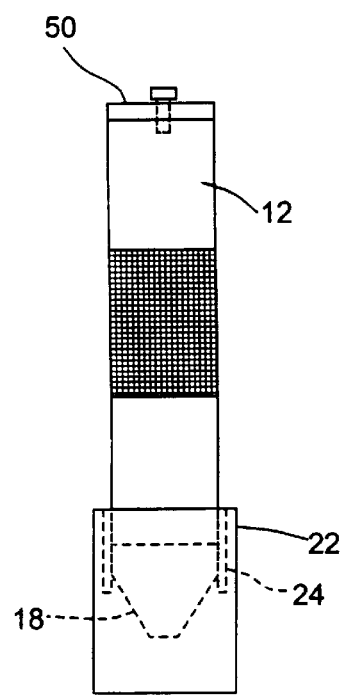
FIG. 3 is a side view of the lubricator of FIG. 1 in its protected position.

Referring to FIGS. 1 and 2, a lubricator in accordance with the present invention is generally shown at 10. The lubricator 10 comprises an elongated, generally cylindrical, hollow tube 12. An interior portion 11 of the hollow tube 12 defines a reservoir for containing a lubricant to be dispensed by the lubricator 10. The tube 12 is preferably comprising polyvinyl chloride (PVC) or other material suitable for containing a lubricant. The tube 12 has opposing ends 14 and 16 with an applicator 18 secured at one end 14 of the tube 12, whereby the applicator 18 is in fluid communication with a lubricant in the reservoir, i.e., in the interior portion 11 of the tube 12. The tube 12 is knurled about a portion 20 thereof to provide a more secure gripping action when using the lubricator 10. An outer sleeve 22 is provided on the tube 12 to protect the applicator 18 and to provide a means for standing the lubricator 10 on end when not in use. It is preferred to stand the lubricator 10 with the applicator 18 pointing downwardly to maintain lubricant in the applicator 18, in other words to avoid drying out of the applicator 18 when not in use. The outer sleeve 22 is secured on tube 12 by press fitting an inner sleeve 24 into the outer sleeve 22 with the inner sleeve 24 being frictionally fit onto the tube 12 (i.e., the inner sleeve 24 is disposed in between the outer sleeve 22 and the tube 12), thereby allowing the outer sleeve 22 to be slid along the tube 12 to expose (FIG. 1) or cover (FIG. 3) the applicator 18.

The applicator 18 is preferably comprising an ultra high molecular weight polyethylene of an open cell construction. The open cell dimension, i.e., the diameter for each cell, is preferably about 20 micron but is functional for the intended purpose as described herein from about 10 microns to about 100 microns in diameter for each cell. Polyethylene is preferred due to its low cost, inert reaction to lubricants (such as a light weight motor oil or mineral oil) and its durability, however polyethylene, polypropylene and polyvinylidene fluoride are suitable substitutes. The preferred open cell size of the polyethylene material is so preferred for the property of wicking lubricant based upon the capillarity in an amount sufficient to quickly and easily apply about 0.001 grams of lubricant. This capillarity of the applicator 18 provides excellent metering of the lubricant.

The applicator 18 has a generally conically shaped tip portion (or a nib) 30 which leads to a generally cylindrical shaped middle portion 32 followed by a generally cylindrically shaped stepped down end portion 34. The outside diameter of the middle portion 32 is slightly less than the outside diameter of the tube 12, so as to avoid the applicator 18 from being caught or accidentally pulled out. A shoulder 36 is defined by the stepped down end portion 34. The end portion 34 is frictionally fit, as described below, into the end 14 of the tube 12 with the shoulder 36 abutting the end 14 of the tube 12, for retaining the applicator 18 thereon. Since the applicator 18 is made of an open cell foam, as discussed above, it is somewhat compressible and will therefore be received and retained in the tube 12 by sizing the outside diameter of the end portion 34 to be slightly larger than the inside diameter of the tube 12. While the tip portion 30 is shown as generally conical (more precisely, having a cone shape with the pointed end of the cone shape cut off, i.e., a frustum or frustoconically shaped), it will be appreciated that it's shaped is determined by its application, whereby it may be generally hemispherical, cylindrical or any other suitable shape for lubricating.

The applicator 18 has a two-section axial bore 28 therethrough. A first section 40 of the axial bore 28 is receptive to lubricant and may promote a generally consistent distribution of lubricant at the applicator 18. However, such is not believed to be necessary as the capillary action of the polyethylene is believed to be sufficient to assure a generally consistent distribution of lubricant at the applicator 18 without the axial bore 28. A second section 42 of the axial bore 28 is slightly larger in diameter than the first section 40, thereby defining a shoulder 44. A plug 46 is inserted into the second section 42 and abuts the shoulder 44 when fully inserted into the second section 42. The outside diameter of the plug 46 is closely sized to the inside diameter of the second section 46 so that a reliable friction fit is obtained upon insertion of plug 46 into the second section 42. The purpose of the plug 46, which may comprise nylon or the same material the applicator 18 comprises, is to close off the axial bore 28 and thereby retain the lubricant in the lubricator 10. The plug 46 would not be required if the axial bore 28 was eliminated, as discussed above.

An open cell foam 48 is disposed inside the interior portion 11 of the tube 12 and may be inserted, at one end thereof, into the axial bore 28, so as to increase the contact of the open cell foam 48 with the applicator 18, i.e., in fluid contact with the reservoir. The open cell foam 48 is a fluid stabilizer which functions with the lubricant in the reservoir 11 and also facilitates wicking of the lubricant to applicator 18 which is then further wicked to the outer surface thereof. The open cell foam 48 comprises, in the preferred embodiment disclosed herein, polyester open cell foam having a pore size in a range from about 50 microns to about 200 microns. The open cell foam 48 aids in the control of the application of lubricant, described hereinafter.

A vent valve assembly 50 is mounted at the end 16 of the tube 12; the end of the tube 12 opposite the applicator 18. The valve assembly 50 seals off the end 16 of the tube 12 and, through regulation of air flow into lubricant reservoir 11, allows the flow of lubricant through the applicator to be turned off or stopped, to thereby prevent continued wicking of lubricant to the tip of the applicator during periods of non-use. The valve assembly 50 comprises a conventional known valve structure which, as depicted in the Figures is simply an end cap 52 secured to the end 16 of the tube 12, with an adjustable screw 54 mounted in an opening 56 for allowing more or less air to enter the tube 12 through the opening 56. When the valve assembly 50 is fully closed, no additional lubricant will be wicked to the applicator 18. It will be appreciated that the end 16 of the tube 12 can in effect be closed by placing in or on the end 16 of the tube 12 an air impermeable seal such as a stopper (comprised of, e.g., rubber, cork, plastic, glass, etc.) or even tape.

Figure 4:
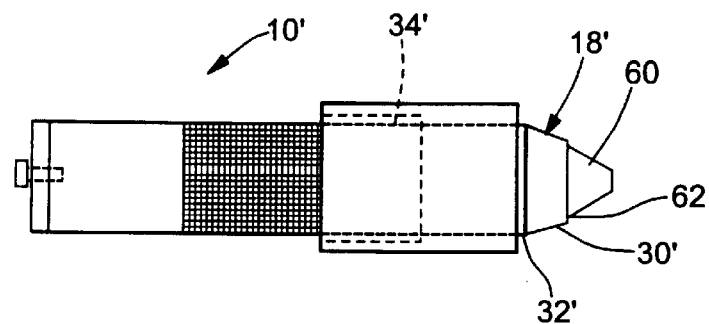
FIG. 4 is a side view of a lubricator in accordance with an alternate embodiment of the present invention.

Referring to FIG. 4, a lubricator 10' in accordance with an alternative embodiment of the invention is generally shown. The applicator 18' of the lubricator 10' has a two-stepped generally conically shaped tip portion (or a nib) 30' which leads to a generally cylindrical shaped middle portion 32' followed by a generally cylindrically shaped stepped down end portion 34'. A first conically shaped portion 60 terminates in a shoulder 62 which leads to a second, larger, conically shaped portion 64. In this example the conical shaped portions are at an angle of approximately 20 degrees and approximately 24 degrees, respectively. With the exception of the two-stepped conical shape the lubricator 10' is the same as lubricator 10 described hereinbefore with reference being made thereto for a further description thereof. The two-stepped applicator 18' allows the lubricator 10' to be used to lubricate various sized openings, without the need for an additional lubricator. Moreover, it will be appreciated that while only two steps are shown any number of steps may be employed by the present invention with such be dictated by the desired application of the lubricator.

Figure 5:
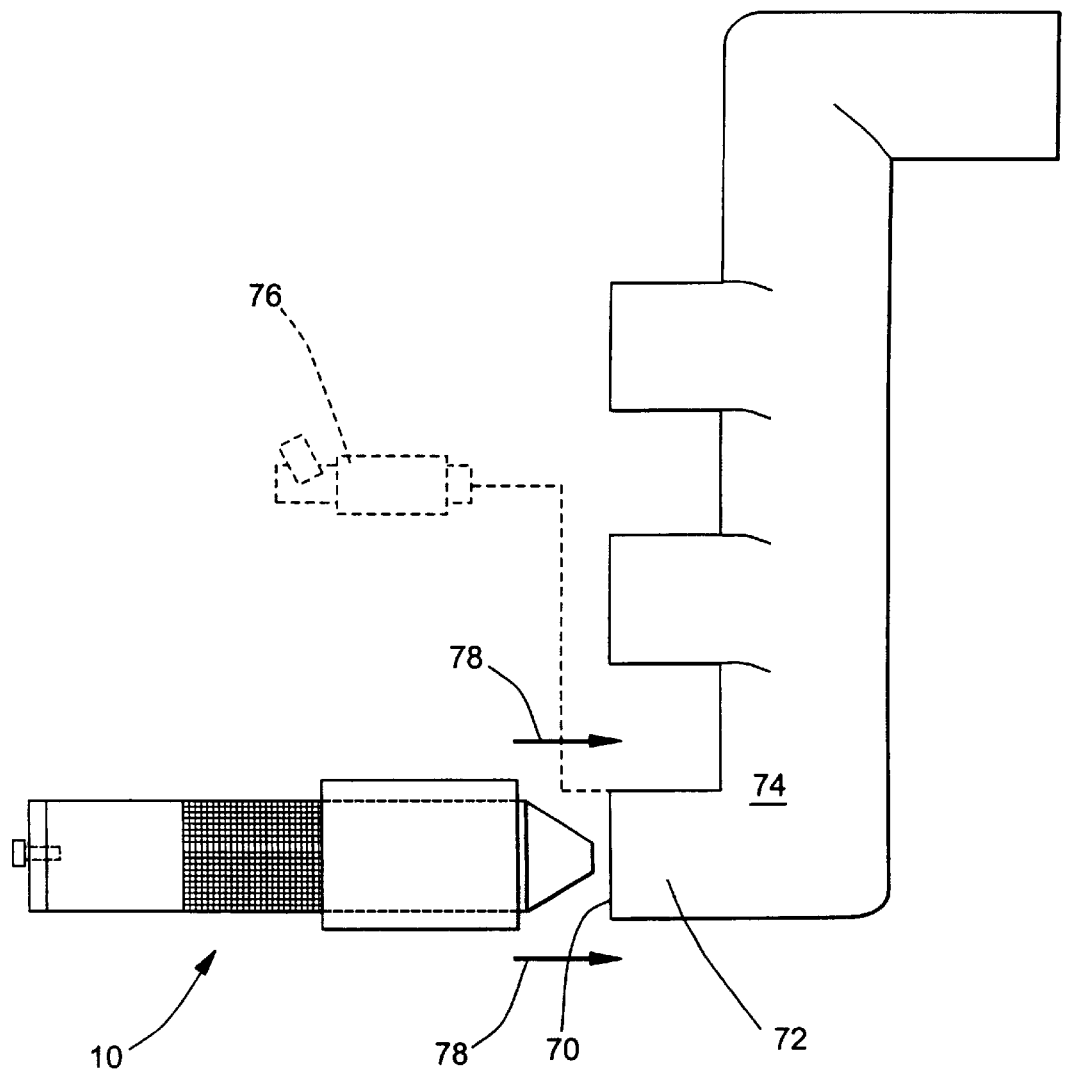
FIG. 5 is a diagrammatic view of the process of lubricating a fuel injector manifold pod with the lubricator of FIG. 1 to aid in the insertion of a fuel injector.
Figure 6:
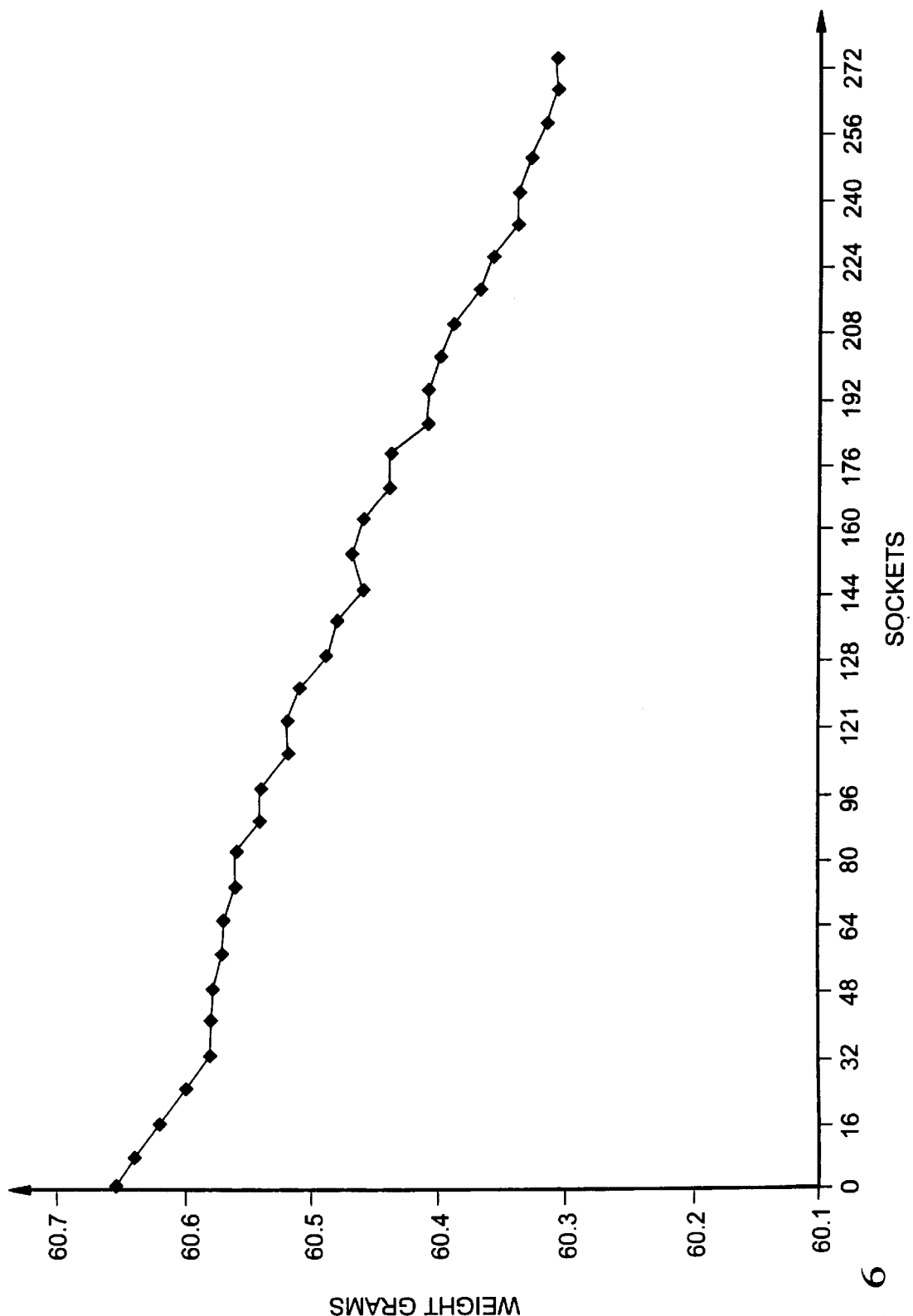
FIG. 6 is a graph of lubrication dispersed by the lubrication of FIG. 1 illustrating the metering capability of the present invention.

During use the lubricator 10 is first charged with an amount of a lubricant (e.g., 10 grams of light weight motor oil) which is absorbed by the open cell foam 48 and is then wicked to the applicator 18. The lubricant is then wicked to the outer surfaces of the applicator 18 which is used for lubricating. More specifically, referring to FIG. 5, the lubricator 10 is used to lubricate the interior surface 70 of a manifold pod 72 of a fuel injector manifold 74 prior to the insertion of a fuel injector 76 into the manifold pod 72. As described hereinbefore, the use of lubrication in the insertion of fuel injectors reduces assembly time by increasing the speed of insertion and protects the o-rings of the fuel injectors during insertion. The conically shaped portion 30 of the applicator 18 is inserted (as illustrated by arrows 78) into the manifold pod 72, with the lubricator 10 being gripped at the knurled portion 20, and the lubricator 10 (and thereby the applicator 18) is rotated one quarter turn in each direction (i.e., clockwise and counterclockwise), thereby applying about 0.001 grams of lubricant to the interior surface 70 of the manifold pod 72. The lubricator 10 is then removed and the fuel injector 74 is inserted in the manifold pod 72. An important advantage of the present invention is that the amount of lubricant applied is extremely reliably dispensed in a desired range throughout use of the lubricator 10. This metering effect of the lubricator 10 is an unexpected benefit, which is graphically illustrated in FIG. 6.

It has been found that applying this metered amount of lubricant at the interior surface 70 of the manifold pod 72 prior to insertion of the fuel injector 74 provides all the aforementioned advantages of lubrication without introducing variability into the manufacturing/assembly process for this component.

It will be appreciated that although the applicator is shown and described as a hand tool, it is not necessarily limited to this form. It is within the scope and spirit of the present invention that the applicator be mounted to automated equipment, whereby the lubricator will not have the same appearance but will function similarly, i.e., the lubricant is dispensed by the capillarity of the material of the applicator.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A lubricator, comprising:
   a) a lubricator body for containing a reservoir receptive to a lubricant;
   b) an applicator tip in fluid communication with said reservoir for receiving and applying said lubricant, said applicator tip having an application surface, an engagement surface and a receiving surface, said engagement surface being configured, dimensioned and positioned to be received and frictionally engaged by said lubricator body, said receiving surface receiving said lubricant from said reservoir, and said application tip comprising an open a cell material having an open cell dimension within a range of about 10 microns to about 100 microns and having a metered capillary property and said applicator tip being compressible with resilient characteristics wherein said application surface of said applicator tip is configured to depend away from said applicator body in a first frustoconical shape extending into a second frustoconical shape, said first frustoconical shape having a lesser angle of inclination then said first frustoconical shape.

2. A lubricator as in claim 1, wherein said reservoir is an open cell foam and said foam is in fluid contact with said receiving surface of said applicator tip.

3. A lubricator as set forth in claim 2, wherein the open cell foam has a pore size within a range of about 50 micros to about 200 microns.

4. A lubricator as set forth in claim 2, wherein said open cell foam comprises a polyester open cell foam.

5. A lubricator comprising:
   a) an elongated applicator body having a first end, a second end, an inner surface and an outer surface, said inner surface defining a reservoir area;
   b) an application opening being positioned at said first end;
   c) a fluid reservoir being configured and dimensioned to be received and positioned within said reservoir area, said fluid reservoir comprising an open cell foam;
   d) an application tip comprising an open cell foam and being configured, dimensioned and positioned into said application opening, said application tip having an application surface, an applicator body engagement surface and a fluid communication surface, said application surface extending outwardly from said applicator body, said engagement surface being configured, dimensioned and positioned to be received within said application opening and to be frictionally engaged by said inner wall of said applicator body and said fluid communication surface being in fluid communication with said fluid reservoir; and
   e) a protective member being configured and dimensioned to be slidably mounted to said applicator body for movement within a range defined by a first position and a second position, said protective member extending beyond said application surface when said protective member is in said first position and said application surface extends beyond said protective member as said protective member is slid from said first position towards said second position.

6. A lubricator as in claim 5 wherein said application surface of said application tip is configured to have a frustoconical shape extending from said first end of said applicator body.

7. A lubricator as set forth in claim 5 wherein said application surface of said applicator tip is configured to have a frustoconical shape extending away from said lubricator body.

8. A lubricator as in claim 5 wherein said application surface of said application tip is configured to have a frustoconical shape extending from said first end of said applicator body, a portion of said frustoconically shape has a diameter smaller than an inner diameter of an elongated tube.

9. A lubricator comprising:
   a) an elongated applicator body having a first end, a second end, an inner surface and an outer surface, said inner surface defining a reservoir area;
   b) an application opening being positioned at said first end;
   c) a fluid reservoir being configured and dimensioned to be received and positioned within said reservoir area, said fluid reservoir comprising an open cell foam; and
   d) an application tip comprising an open cell foam and being configured, dimensioned and positioned into said application opening, said application tip having an application surface, an applicator body engagement surface and a fluid communication surface, said application surface extending outwardly from said applicator body, said engagement surface being configured, dimensioned and positioned to be received within said application opening and to be frictionally engaged by said inner wall of said applicator body and said fluid communication surface being in fluid communication with said fluid reservoir; and
   e) a protective member being configured and dimensioned to be slidably mounted to said applicator body for movement within a range defined by a first position and a second position, said protective member extending beyond said application surface when said protective member is in said first position and said application surface extends beyond said protective member as said protective member is moved from said first position towards said second position.

10. A lubricator as set forth in claim 9, wherein said applicator tip comprises an ultrahigh molecular weight polymer.

11. A lubricator as set forth in claim 10 wherein said polymer is polyethylene.

12. A lubricator as set forth in claim 9 wherein the dimension of the cells of the material comprising said applicator tip is about 20 microns.

13. A lubricator as set forth in claim 9, wherein said protective member is
   a sleeve slidably mounted to said lubricator body for movement between said first position and said second position, said application surface of said applicator tip being covered by said sleeve when said sleeve is in said first position, said application surface being exposed as said sleeve is moved from said first position to said second position.

14. A lubricator as set forth in claim 9, further comprising:
   a vent valve assembly positioned on said lubricator body, said vent valve assembly providing an air passageway to said reservoir.

15. A lubricator as in claim 9, wherein said protective member is an elongated sleeve having an opening for said application surface to pass through.

16. A lubricator as in claim 15 wherein said opening of said elongated sleeve is configured to have a support surface for supporting said lubricator on a planar surface when said application tip protector is in said first position, said lubricator being supported by said support surface in a manner which maintains said application surface within an area defined by said sleeve and said planar surface upon which said lubricator is supported.

17. A lubricator as in claim 9 wherein said application surface of said application tip is configured to have a frustoconical shape extending from said first end of said applicator body.

18. A lubricator as in claim 9, further comprising:
f) A valve assembly for manipulating an air passageway, said valve assembly being positioned on said second end of said applicator body and said air passageway communicating with said reservoir.

19. A lubricator as in claim 9, wherein said application tip further comprises an engagement shoulder positioned in between said engagement surface and said application surface of said application tip said engagement shoulder and said application tip being configured, dimensioned and positioned so that said engagement shoulder engages said first end of said applicator body as said application tip is positioned within said application opening of said applicator body.

20. A lubricator as in claim 9, wherein a portion of said outer surface is knurled to provide a gripping surface.

21. A lubricator as in claim 9, wherein said application tip further comprises an elongated opening extending from said fluid communication surface to said application surface.

22. A lubricator as in claim 9, wherein said application surface of said applicator tip is configured to depend away from said applicator body in a first frustoconical shape extending into a second frustoconical shape, said first frustoconical shape having lesser angle of inclination then said first frustocotical shape and a portion of said first frustoconical shape has a diameter smaller than inner diameter of a first elongated tube and at portion of said second frustoconical shape has a diameter smaller than an inner diameter of a second elongated tube, said inner diameters of said first and second elongated tubes being unequal.

* * * * *